United States Patent [19]

Pearson

[11] Patent Number: 4,723,608

[45] Date of Patent: Feb. 9, 1988

[54] DEPTH SENSING SKID ASSEMBLY

[75] Inventor: Michael L. Pearson, Ankeny, Iowa

[73] Assignee: Deere & Company, Moline, Ill.

[21] Appl. No.: 913,200

[22] Filed: Sep. 30, 1986

[51] Int. Cl.$^4$ .................................... A01B 63/114
[52] U.S. Cl. .......................... 172/430; 172/4;
                                        172/712; 172/265
[58] Field of Search ............... 172/4, 4.5, 430, 264,
        172/265, 618, 705, 712, 764; 56/10.2; 180/131

[56] References Cited

U.S. PATENT DOCUMENTS

| | | | |
|---|---|---|---|
| 1,604,721 | 10/1926 | Riepe | 172/712 X |
| 3,402,784 | 9/1968 | Roberson et al. | 180/131 |
| 3,658,133 | 4/1972 | Sweet et al. | 172/4 |
| 3,844,357 | 10/1974 | Ellinger | 172/4 |
| 4,031,963 | 6/1977 | Poggemiller et al. | 172/4 |
| 4,252,198 | 2/1981 | Formhals | 172/712 X |
| 4,355,688 | 10/1982 | Hamm et al. | 172/4 |
| 4,600,060 | 7/1986 | Winter et al. | 172/4 |

FOREIGN PATENT DOCUMENTS

| | | | |
|---|---|---|---|
| 704545 | 2/1965 | Canada | 56/10.2 |
| 912092 | 3/1982 | U.S.S.R. | 172/430 |

*Primary Examiner*—Richard T. Stouffer

[57] ABSTRACT

A depth sensing skid arrangement for an implement including a spring steel depth skid connected to a shank which in turn is pivotally connected to a shank support bracket including a spring trip arrangement which permits backing of the implement without damage to the skid or shank. The shank support bracket in turn is connected to a transverse beam operably connected to valve control structure for operating a hydraulic cylinder to maintain a preselected depth of penetration of earth-working tools mounted on the frame. To provide an averaging effect, two resilient depth skids are transversely spaced on the beam.

7 Claims, 5 Drawing Figures

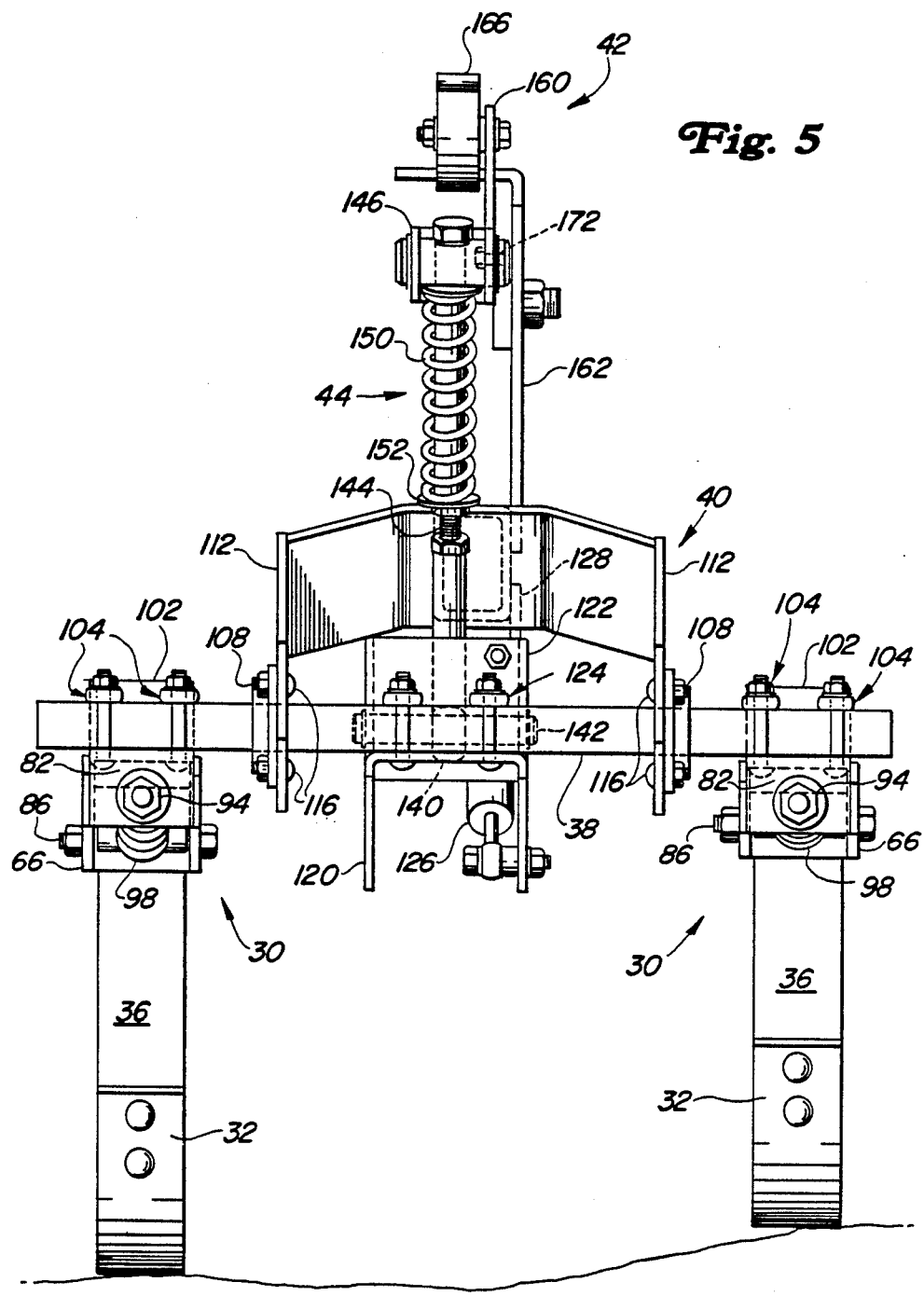

DEPTH SENSING SKID ASSEMBLY

BACKGROUND OF THE INVENTION

The present invention relates generallly to agricultural implements, and more specifically, to depth sensing devices for automatic depth control systems which adjust the depth of penetration of ground working tools on an implement.

Automatic depth control systems for tillage and planting implements have become more popular in recent years and are utilized to maintain a constant depth of penetration of the ground engaging tools with varying soil, terrain and load distribution conditions. On seeding and fertilizing implements which utilize a hopper carrying granular material, the weight of the implement changes significantly as the hopper depletes thereby changing the down-pressure on the tools and resulting in depth variations. To overcome problems of depth variation, ground sensing devices are spaced along the width of the implement and are connected through automatic control systems which maintain implement height at a preselected level to provide more uniform depth control.

Various types of height sensing structure have been suggested including noncontacting devices such as optical and acoustic distance sensing devices, but these usually require complex electronic circuitry and can often malfunction in the hostile environment encountered by an agricultural implement. Ground-contacting types of devices such as a rolling wheel arrangement shown in U.S. Pat. No. 4,355,688 or a skid assembly such as shown in U.S. Pat. No. 4,600,060 are relatively bulky in configuration and are expensive to manufacture. Such devices do not lend themselves to be easily moved in the reverse direction and such movement can damage them and render them ineffective. Also, where space is limited on the main frame of an implement, such arrangement of rolling wheels or skids is difficult to mount.

OBJECTS OF THE INVENTION

It is therefore an object of the present invention to provide an improved depth sensing structure for use with an implement. It is a further object to provide such a structure which is simpler and more compact in construction than at least most previously available depth sensing structure.

It is a further object of the present invention to provide an improved depth sensing skid for depth sensing structure. It is a further object to provide such a skid which can pivot to prevent breakage or bending when the implement is backed up. It is still another object to provide such a skid which automatically returns to its normal sensing position when the implement is raised.

It is a further object to provide a depth sensing structure having a sensing skid wherein the structure provides a reliable average indication of implement frame distance above the surface of the ground. It is a further object to provide such a structure which is relatively compact, easy to mount everywhere space is limited and inexpensive to manufacture.

BRIEF DESCRIPTION OF THE INVENTION

In accordance with the above objects, a depth sensing structure is provided including a main bracket fixed to the implement frame and rotatably supporting a square beam. The beam is supported by a pair of transversely spaced bearings carried on the main bracket by flangettes. A skid support assembly is fixed to the square beam, either outwardly of one of the bearings or between the bearings within the main bracket, depending upon the space available on the implement frame. The skid support assembly includes a fore-and-aft extending bracket and a shank pivotally connected to the aft end of the bracket. The forward portion of the bracket includes an end bent downwardly at an angle of about ninety degrees with respect to the remainder of the bracket, and a spring is compressed between the downturned end and the shank to bias the shank toward a downwardly and rearwardly directed field-working position. An adjustable bolt extends through the center of the spring and is connected to the shank for limiting the rearward rocking of the shank about its pivotal connection with the bracket. A curved piece of spring steel is connected to the lower end of the shank and serves as a ground contacting member. Changes in height between the main frame and the surface of the ground in contact with the curved ground engaging portion cause the entire skid support assembly to rock thereby rocking the square beam in the bearings. Valve control structure is operably connected by a spring-loaded link to a link bracket fixed to the square beam between the bearings. As the skid support assembly rocks, the valve control structure is operated to control a hydraulic lift cylinder on the implement and maintain a preselected relationship between the frame and the surface of the ground. When the implement is backed up with the depth control skid located close to the ground, for example, to clean plugged implement sweeps, the shank can rock forwardly about its pivotal connection with the shank bracket against the bias of the spring to prevent deformation or breakage of the skid. The operator then can lift the implement at which time the spring will restore the skid to its normal field-working operative position. The tension link may be adjusted to adjust the vertical operating position of the skid. Since the skid and shank are rockably connected with respect to the square beam on which the entire skid support assembly is mounted, excess forces operating on the valve control structure when the implement is backed are also reduced.

These and other objects, features and advantages of the present invention will become apparent to one skilled in the art upon reading the following detailed description in view of the drawings.

BRIEF DESCRIPTION OF THE DRAWINGS

FIG. 5 is a rear view of one embodiment of a depth sensing structure and showing the averaging effect of a pair of resilient skids.

DESCRIPTION OF THE PREFERRED EMBODIMENT

Figure 1:
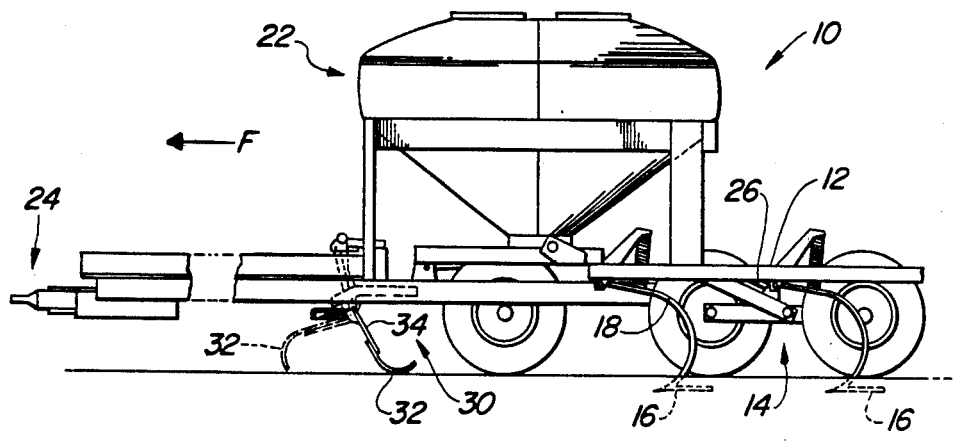
FIG. 1 is a side elevational view of a seeding implement with the depth sensing structure of the present invention attached thereto.

Referring now to FIG. 1, there is shown a seeding implement 10 having a main frame 12 supported for forward movement (F) over the ground by a vertically adjustable ground engaging wheel assembly 14 and carrying a plurality of earth-working tools 16 from shank assemblies 18. Hopper structure 22 is mounted on the main frame 12 for supplying granular material through a conventional distribution system (not shown) to the soil adjacent the earth-working tools 16. Hitch structure 24 is adapted for connecting to a towing vehicle. A hydraulic cylinder 26 is operably connected to the ground wheel assembly 14 for raising and lowering the implement frame 12 to adjust the depth of penetration of the earth-working tools 16. With varying soil and ground contour conditions, and with changing frame load due to the changing fill of the hopper structure 22, the depth of penetration of the earth-working tools 16 will vary. To control the height of frame 12 above the ground and therefore the depth of penetration of the tools, a depth sensing assembly 30 is connected to the frame 12 and is operably connected to the hydraulic cylinder 26 to automatically maintain a preselected distance between the frame 12 and the surface of the ground.

The assembly 30 includes a depth skid 32 carried on a shank 34 which in turn is pivotally connected to a shank support bracket 36. The bracket 36 in turn is fixed to a transverse square beam or rockshaft 38 (FIGS. 2 and 3) supported for rotation about a transverse axis by a main support bracket 40. Valve control structure 42 is operably connected through a spring-cushioned link 44 to the square beam 38 and is responsive to rotation of the beam 38 to operate a hydraulic depth sensing valve 48 which is connected to a source of hydraulic fluid (not shown) on the towing vehicle to generate a fluid signal to control the hydraulic cylinder 26. As the height of the frame 12 above the ground surface changes, the depth skid 32 will rock the beam 38 to thereby move the valve control structure 42 and operate the depth sensing valve 48. The valve 48 in turn controls the cylinder 26 to adjust the ground wheel assembly 14 to maintain a preselected relationship between the frame and the ground surface to control the depth of penetration of the tools 16.

The depth skid 32 is fabricated from spring steel to provide a resilient, wear-resistant soil-engaging member, and has an upper end 52 connected by bolts 54 to the lower end of the shank 34. The skid 32 extends downwardly and rearwardly from the end 52 to a curved, soil-engaging portion 56 extending to a rearwardly and upwardly directed end 58.

The shank 34 extends upwardly from the connection with the skid 32 to an upper end 62 connected by bolts 64 to the bight portion of a forwardly opening, channel shaped member 66 which in turn is pivotally connected to the shank support bracket 36. Shanks 34 of different lengths may be provided to adapt the depth sensing assembly 30 to different machines.

The shank support bracket 36 includes a generally horizontal fore-and-aft extending portion 72 with a bushing assembly 74 welded to the forward end thereof. A bolt 76 extends through the upper portion of the side legs of the channel shaped member 66 and through the bushing assembly 74 for rockably connecting the shank 34 to the support bracket 36 for pivoting about the axis of the bolt 76.

The horizontal portion 72 of the bracket 36 extends forwardly to a downturned end 82. The end 82 and the portion 72 are connected on either side by gussets 84.

Figure 2:
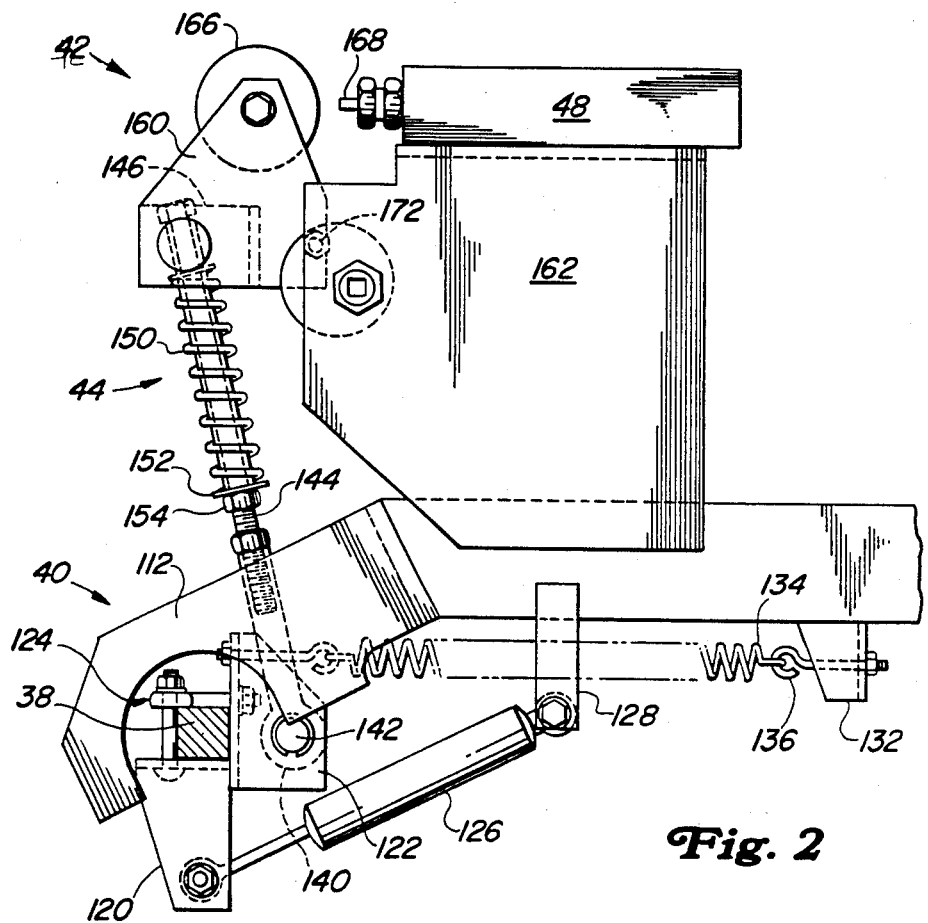
FIG. 2 is an enlarged side view of a portion of the depth sensing structure of FIG. 1.
Figure 3:
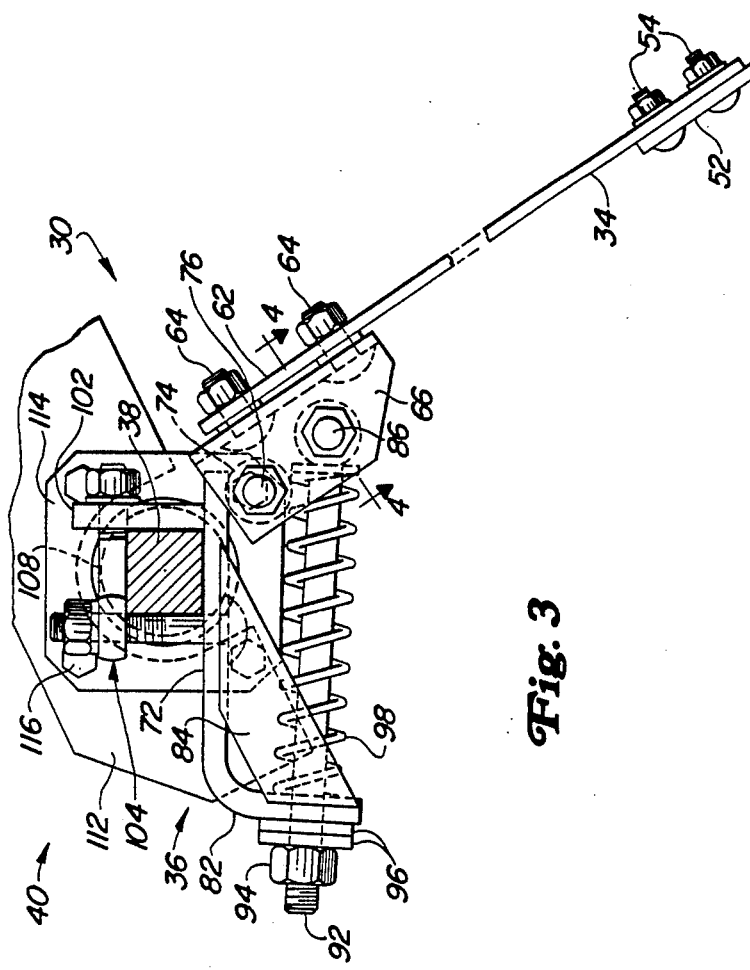
FIG. 3 is an elongated side view of the depth sensing assembly.

A second pivot bolt 86 located rearwardly and below the bolt 76 extends through a bushing 88 and through the eye end of an eyebolt 92. The forward end of the bolt 92 extends through an aperture in the downturned end 82, and a nut 94 is adjustably threaded onto the end and bars against washers 96 which stop against the foward face of the end 82 when the depth sensing assembly 30 is in the field-working position as shown in FIG. 2. A compression spring 98 encircling the shank of the bolt 92 is compressed between the aft face of the downturned end 82 and the eye end of the bolt 92. The compression spring 98 yielding urges the shank 34 to the downwardly and rearwardly directed position as shown in FIG. 2 and yet permits the shank to rock against the bias of the spring in the clockwise direction when the implement is backed (broken lines of FIG. 1) so that the shank 34 and depth skid 32 will not be deformed or broken. When the implement is lifted with the shank 34 in the tripped position as shown in the dotted lines of FIG. 1, the spring 98 will automatically restore the shank 34 to its field-working position as shown in FIG. 2. The field-working position may be adjusted by turning the nut 94 on the threaded end of the eyebolt 92 and/or by changing to a shank 34 of a different length. The spring 98 in its extended position as shown in FIG. 2 is sufficiently uncompressed to permit substantial rocking of the shank 34 about the pivot 76 in the forward or counterclockwise direction as viewed in FIG. 2. The shank 34 can therefore rock forwardly during backing of the implement 10 without substantial rocking of the shank support bracket 36 which is attached to the square beam 38.

The shank support bracket 36 includes an upwardly directed connecting bracket 102 secured against the aft face of the beam 38 by a bolt bracket assembly 104 which also secures the top face of the horizontal portion 72 against the bottom face of the beam 38.

The square beam 38 is rotatably mounted in the main support bracket 40 by a pair of transversely spaced bearings 108. The bracket 40 includes a bifurcated end 112, each side of which supports one of the bearings 108 with a flangette mounting 114 secured to the sides of the end 112 by bolts 116. The sides of the bifurcated end 112 are transversely spaced to permit the entire shank support bracket 36 and depth skid assembly to be mounted between the sides if necessary when space is limited on the frame 12.

Figure 4:
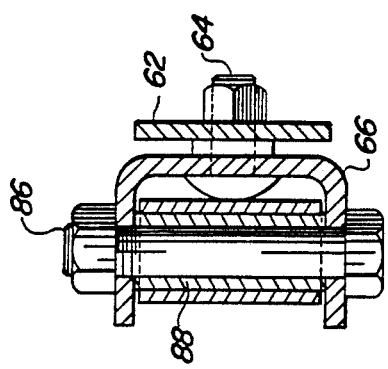
FIG. 4 is a view taken substantially along lines 4—4 of FIG. 3.

Lower and rear brackets 120 and 122 (FIG. 2) are connected to the bottom and aft faces, respectively, of the square beam 38 between the bifurcated ends 112 by a bolt bracket assembly 124. A shock absorber 126 is connected to the lower bracket 120 and extends rearwardly and upwardly therefrom to a connection with a support 128 extending downwardly from the bracket 40. A spring support bracket 132 extends downwardly from the bracket 40 rearwardly of the support 128, and a spring 134 is tensioned between the bracket 132 and the top bracket 122 to bias the beam 38 in the counterclockwise direction (FIGS. 2 and 4) to urge the soil-engaging portion 56 of the skid 32 into engagement with the surface of the ground. An adjustable length eyebolt 136 connects the aft end of the spring 134 with the spring support 132 to provide down-pressure adjustment. The shock absorber 126 dampens oscillations and provides an averaging effect for the depth sensing assembly 30.

The spring-cushioned link 44 includes an eye end 140 pivotally connected by a pin 142 to the upper bracket 122 on the beam 38. The upper end of the link 44 includes a bolt 144 threaded into the eye end 140 of the link. The upper end of the bolt 144 is slidably received within a receiving bracket 146 on the valve control structure 42. A compression spring 150 is supported over the shank of the bolt 144 between the receiving bracket 146 and the lower portion of the bolt. The lower portion of the spring 150 abuts against a washer 152 which in turn is located along the length of the bolt 144 by a nut 154. The bracket 146 is connected to a control plate 160 which in turn is pivotally connected to an upright plate 162 supported from the main bracket 40. A circuit valve engaging member 166 is connected to the upper end of the control plate 160 to operate the hydraulic depth sensing valve 48 in response to rocking of the square beam 38 by the depth sensing assembly 30. The valve 48 is of the type shown and described in U.S. Pat. No. 4,579,038, incorporated herein by reference. The valve 48 includes a spool-operating extension normally biased into contact with the circular valve engaging member 166. As the control plate 160 is rocked by the depth sensing assembly 30, the extension 168 is moved with the member 166 to control hydraulic fluid under pressure to the hydraulic cylinder 26 to maintain a preselected relationship between the frame 12 and the top of the ground. The control plate 160 is pivotally connected at 172 to a rotating member which permits adjustment of the pivotal connection 172 to change the automatic depth setting. The length of the spring-cushioned link 44 and the length of the shank 34 may also be changed to adjust the working position of the frame. The upper end of the bolt 144 can slide relative to the receiving bracket 146 as the spring 150 is compressed when the beam 38 pivots in the counterclockwise direction (FIG. 3) beyond the position wherein the spool-operating extension 168 has reached its rightmost position (FIG. 2). This feature prevents damage to the valve or valve operating structure when the depth skid 32 is rocked to an extreme upward position. A further description of the valve control structure 42 may be had from U.S. Pat. No. 4,600,060, incorporated herein by reference.

In operation in the automatic depth control mode, the frame 12 is lowered until the depth skid 32 rocks the beam 38 to an intermediate position to move the valve 48 to a neutral position wherein hydraulic fluid flow to the cylinder 26 is cut off. If the depth of penetration of the tools 16 should decrease, for example, when the hopper structure 22 begins to deplete and the weight on the frame 12 decreases, the skid 32 will rock the shank support bracket 36 and thus the beam 38 in the clockwise (FIG. 2) direction. The spring-cushioned link 44 thereby rocks the control plate 160 downwardly about the pivot 172 to cause the valve engaging member 166 to permit the spool operating extension 168 to move to the left. Such movement of the extension 168 causes the cylinder 26 to retract to lower the frame 12 until the valve engaging member 166 rocks sufficiently to bring the sensing valve 48 back to the neutral position. When the depth of penetration of the tools 16 increases, for example, when the hopper structure 22 is filled or when soft ground conditions are encountered, the depth skid 32 rocks the shank support bracket 36 in the counteclockwise direction (FIG. 2) to thereby rock the valve engaging member 166 toward the valve 48 which in depresses the extension and causes the cylinder 26 to extend and raise the frame 12 to decrease penetration. The frame raises until the beam 38 rocks sufficiently to move the member 166 and the valve spool operating extension 168 to the neutral position.

If the operator should back the implement 10 when the depth skid 32 is close to the ground, for example, when the operator tries to clear debris from the earthworking tools 16, and the skid 32 catches, the shank 34 can pivot about the pivot bolt 76 in the clockwise direction (FIG. 2) to compress the spring 98 thereby preventing breakage or damage to the skid 32 or shank 34. When the frame 12 is raised, the skid 32 will be restored to its operative depth sensing position by expansion of the spring 98 which pivots the shank 34 in the counterclockwise direction about the pivot bolt 76. The tripping action of the depth skid 32 and shank 34 operates relatively independently of rotational movement of the square beam 38 thereby shielding the valve 48 and the valve operating structure associated therewith from excessive forces during tripping of the skid. If necessary, by locating a substantial portion of the depth sensing assembly 30 between the bifurcated end 112 of the main support bracket 40, a relatively compact structure is provided which can be accommodated on most any implement regardless of the space limitations that may exist. The spring steel skid 32 is long-lasting and in combination with the shock absorber 126 provides a good averaging effect for smooth valve operation even in rough and trashy soil. Additional averaging effect can be provided by attaching two of the resilient skids 32 to the beam 38 at transversed locations (FIG. 5). As shown, one of the skids 32 can flex upwardly and the other can flex downwardly with no net rocking of the beam 38. The second skid 32 is attached to the beam 38 in a manner identical to that described above for the first skid so that both may trip upon backing of the implement 10. Down-pressure operating on the skid 32 can be adjusted as necessary with the eyebolt 136 which supports the down-pressure spring 134.

Having described the preferred embodiment, it will be apparent that modifications can be made without departing from the scope of the invention as defined in the accompanying claims.

I claim:

1. In an agricultural implement including a frame adapted to be supported above the ground and adapted for towing normally in the forward direction, earthworking tools supported from the frame for penetrating the soil, and means for vertically adjusting the frame relative to the ground to change the depth of penetration of the tools, a height sensing structure comprising:

a main support bracket connected to the frame;

depth skid structure including: a skid support bracket rockably connected to the main support bracket, a downwardly extending ground engageable depth skid and means pivotally connecting the depth skid to the skid support bracket for rocking the depth skid about the connecting means to the support bracket, such that the depth skid pivots about the connecting means between a trailing operative position and a forwardly directed tripped position, and means normally biasing the depth skid to the operative position for causing the depth skid to rock the skid support bracket with changes in the distance between frame and the ground while permitting the skid to pivot forwardly about the connecting means when the implement is backed in the rearward direction; and means responsive to the rocking of the skid support bracket for generating a signal indicative of the distance between the frame and the ground.

2. The invention as set forth in claim 1 wherein the main support bracket includes transversely spaced end portions and the skid support bracket is supported between the end portions.

3. The invention as set forth in claim 1 wherein the skid support bracket includes a fore-and-aft extending member with the means pivotally connecting including a pivot connected to the aft end of said member, and the means biasing including a spring compressed betwen the forward end of said member and the depth skid.

4. The invention as set forth in claim 3 including an adjustable length tension member extending between the forward end of the fore-and-aft member and the depth skid for adjusting the operative position of the depth skid.

5. The invention as set forth in claim 1 further comprising a transversely extending beam having a beam axis and means connecting the skid support bracket to the beam at a first location, a second skid support bracket connected to the beam at a second location offset transversely from the first location, a second depth skid connected to the second bracket, and wherein both of said skids act to rock the beam about the beam axis and provide an averaging effect on rough ground.

6. In an agricultural implement including a frame adapted to be supported above the ground and adapted for towing normally in the forward direction, earth-working tools supported from the frame for penetrating the soil, and means for vertically adjusting the frame relative to the ground to change the depth of penetration of the tools, a height sensing structure comprising:

a rockshaft;
means connecting the rockshaft to the implement for rocking the rockshaft about a transverse axis;
a support bracket fixed to the rockshaft;
a shank having an upper end pivotally connected to the support bracket, and a lower end;
a resilient skid connected to and extending rearwardly from the lower end, said skid mounted for pivotal movement about the pivotal connection of the shank to the support bracket between a trailing operative position and a forwardly projecting tripped position;
spring means connected to the bracket for normally urging the shank to a downwardly and rearwardly projecting position wherein the skid is located in the operative position rearwardly of and below the pivotal connection of the shank to the support bracket;
means biasing the rockshaft in a direction about the transverse axis for causing the skid to engage the ground as the tools penetrate the soil so that as the height of the implement frame relative to the ground changes, the skid will rock the support bracket and rockshaft;
wherein said spring means maintains a substantially constant angular relationship between the shank and the support bracket when the shank is in the operative position while permitting the shank to move to the forwardly projecting tripped position as the implement is moved in the rearward direction; and
means responsive to the rocking of the rockshaft for generating a signal indicative of the distance between the frame and the ground.

7. The invention as set forth in claim 6 wherein the spring means permits the shank to rock about its pivotal connection with the support bracket independently of pivoting of said rockshaft when the implement is moved in the rearward direction.

* * * * *